(12) United States Patent
Auxier et al.

(10) Patent No.: US 9,453,419 B2
(45) Date of Patent: Sep. 27, 2016

(54) GAS TURBINE ENGINE TURBINE BLADE TIP COOLING

(71) Applicant: United Technologies Corporation, Hartford, CT (US)

(72) Inventors: James T. Auxier, Bloomfield, CT (US); Jason L. O'Hearn, Wethersfield, CT (US); Thomas N. Slavens, Vernon, CT (US); Yafet Girma, Hartford, CT (US)

(73) Assignee: UNITED TECHNOLOGIES CORPORATION, Hartford, CT (US)

( * ) Notice: Subject to any disclaimer, the term of this patent is extended or adjusted under 35 U.S.C. 154(b) by 1004 days.

(21) Appl. No.: 13/729,110

(22) Filed: Dec. 28, 2012

(65) Prior Publication Data
US 2014/0212298 A1 Jul. 31, 2014

(51) Int. Cl.
*F01D 5/18* (2006.01)
*F01D 5/20* (2006.01)
*F01D 11/08* (2006.01)

(52) U.S. Cl.
CPC .............. *F01D 5/186* (2013.01); *F01D 5/20* (2013.01); *F01D 11/08* (2013.01); *F05D 2240/307* (2013.01); *Y02T 50/676* (2013.01)

(58) Field of Classification Search
CPC .......... F01D 5/18; F01D 5/186; F01D 5/187; F01D 5/20; F01D 11/08
See application file for complete search history.

(56) References Cited

U.S. PATENT DOCUMENTS

| | | | |
|---|---|---|---|
| 5,476,363 A | 12/1995 | Freling et al. | |
| 5,791,871 A * | 8/1998 | Sech et al. | 415/173.1 |
| 6,059,530 A | 5/2000 | Lee | |
| 6,190,129 B1 | 2/2001 | Mayer et al. | |
| 6,422,821 B1 * | 7/2002 | Lee et al. | 416/224 |
| 6,595,749 B2 * | 7/2003 | Lee et al. | 416/97 R |
| 7,473,073 B1 | 1/2009 | Liang | |
| 7,584,538 B2 | 9/2009 | Lee | |
| 7,597,539 B1 | 10/2009 | Liang | |
| 7,857,587 B2 | 12/2010 | Correia et al. | |
| 8,092,179 B2 | 1/2012 | Paauwe et al. | |
| 8,113,779 B1 * | 2/2012 | Liang | 416/92 |
| 8,172,507 B2 | 5/2012 | Liang | |
| 2004/0197190 A1 | 10/2004 | Stec et al. | |
| 2009/0129934 A1 | 5/2009 | Gu | |

OTHER PUBLICATIONS

U.S. Appl. No. 13/586,071, filed Aug. 15, 2012, "Suction Side Turbine Blade Tip Cooling".
International Search Report and Written Opinion for PCT Application No. PCT/US2013/075796, mailed Oct. 1, 2014.
International Preliminary Report on Patentability for PCT Application No. PCT/US2013/075796, mailed Jul. 9, 2015.

* cited by examiner

*Primary Examiner* — Dwayne J White
*Assistant Examiner* — Julian Getachew
(74) *Attorney, Agent, or Firm* — Carlson, Gaskey & Olds, P.C.

(57) ABSTRACT

An airfoil for a gas turbine engine includes pressure and suction walls spaced apart from one another and joined at leading and trailing edges to provide an airfoil having an exterior surface that extends in a radial direction to a tip. A camber line at the tip extends from the leading edge to the trailing edge. Pressure and suction side shelves are arranged in the exterior surface on opposing sides of the camber line respectively in the pressure and suction side walls. A plateau is proud of and separates the pressure and suction side shelves. The plateau is arranged along the camber line and extends to the leading edge.

13 Claims, 3 Drawing Sheets

GAS TURBINE ENGINE TURBINE BLADE TIP COOLING

BACKGROUND

This disclosure relates to a gas turbine engine. More particularly, the disclosure relates to a tip cooling configuration for an airfoil.

Gas turbine engines typically include a compressor section, a combustor section and a turbine section. During operation, air is pressurized in the compressor section and is mixed with fuel and burned in the combustor section to generate hot combustion gases. The hot combustion gases are communicated through the turbine section, which extracts energy from the hot combustion gases to power the compressor section and other gas turbine engine loads.

Both the compressor and turbine sections may include alternating series of rotating blades and stationary vanes that extend into the core flow path of the gas turbine engine. For example, in the turbine section, turbine blades rotate and extract energy from the hot combustion gases that are communicated along the core flow path of the gas turbine engine. The turbine vanes, which generally do not rotate, guide the airflow and prepare it for the next set of blades.

Turbine blades typically include internal cooling passages. Film cooling holes communicate cooling fluid from the cooling passages to areas on the exterior surface of the turbine blade that may experience undesirably high temperatures.

One high temperature area is the tip of the airfoil. A proposed cooling configuration uses a notch circumscribed about the entire perimeter of the airfoil at the tip, which permits leakage of the working fluid past the tip.

SUMMARY

In one exemplary embodiment, an airfoil for a gas turbine engine includes pressure and suction walls spaced apart from one another and joined at leading and trailing edges to provide an airfoil having an exterior surface that extends in a radial direction to a tip. A camber line at the tip extends from the leading edge to the trailing edge. Pressure and suction side shelves are arranged in the exterior surface on opposing sides of the camber line respectively in the pressure and suction side walls. A plateau is proud of and separates the pressure and suction side shelves. The plateau is arranged along the camber line and extends to the leading edge.

In a further embodiment of any of the above, the airfoil has a cooling passage arranged between the pressure and suction walls that extend toward the tip. Cooling holes fluidly interconnect the cooling passage and the pressure and suction side shelves.

In a further embodiment of any of the above, the cooling holes are spaced from the plateau.

In a further embodiment of any of the above, the plateau extends from the leading edge to the trailing edge. The camber line separates the pressure and suction side shelves.

In a further embodiment of any of the above, the tip includes a perimeter and the plateau extends to the perimeter at the leading and trailing edges.

In a further embodiment of any of the above, the pressure side shelf is spaced from the trailing edge.

In a further embodiment of any of the above, the suction side shelf is spaced from the trailing edge.

In a further embodiment of any of the above, the pressure side shelf is spaced from the leading edge.

In a further embodiment of any of the above, the suction side shelf is spaced from the leading edge.

In a further embodiment of any of the above, the pressure side is concave and the suction side is convex.

In a further embodiment of any of the above, the camber line generally bisects the pressure and suction sides.

In a further embodiment of any of the above, the airfoil is a turbine blade.

In another exemplary embodiment, a gas turbine engine includes a compressor and turbine section mounted to a shaft. A combustor is arranged between the compressor and turbine section. The gas turbine engine includes an airfoil in one of the compressor and turbine sections. The airfoil includes pressure and suction walls spaced apart from one another and joined at leading and trailing edges to provide an airfoil having an exterior surface that extends in a radial direction to a tip. A camber line at the tip extends from the leading edge to the trailing edge. Pressure and suction side shelves are arranged in the exterior surface on opposing sides of the camber line respectively in the pressure and suction side walls. A plateau is proud of and separates the pressure and suction side shelves. The plateau is arranged along the camber line and extends to the leading edge.

In a further embodiment of any of the above, the airfoil is in the turbine section.

In a further embodiment of any of the above, the gas turbine engine includes a blade outer air seal. The tip is arranged in adjacent to the blade outer air seal.

In a further embodiment of any of the above, the airfoil has a cooling passage arranged between the pressure and suction walls that extend toward the tip. Cooling holes fluidly interconnect the cooling passage and the pressure and suction side shelves. The cooling holes are spaced from the plateau.

In a further embodiment of any of the above, the plateau extends from the leading edge to the trailing edge. The camber line separates the pressure and suction side shelves. The tip includes a perimeter and the plateau extends to the perimeter at the leading and trailing edges.

BRIEF DESCRIPTION OF THE DRAWINGS

The disclosure can be further understood by reference to the following detailed description when considered in connection with the accompanying drawings wherein.

DETAILED DESCRIPTION

Figure 1:
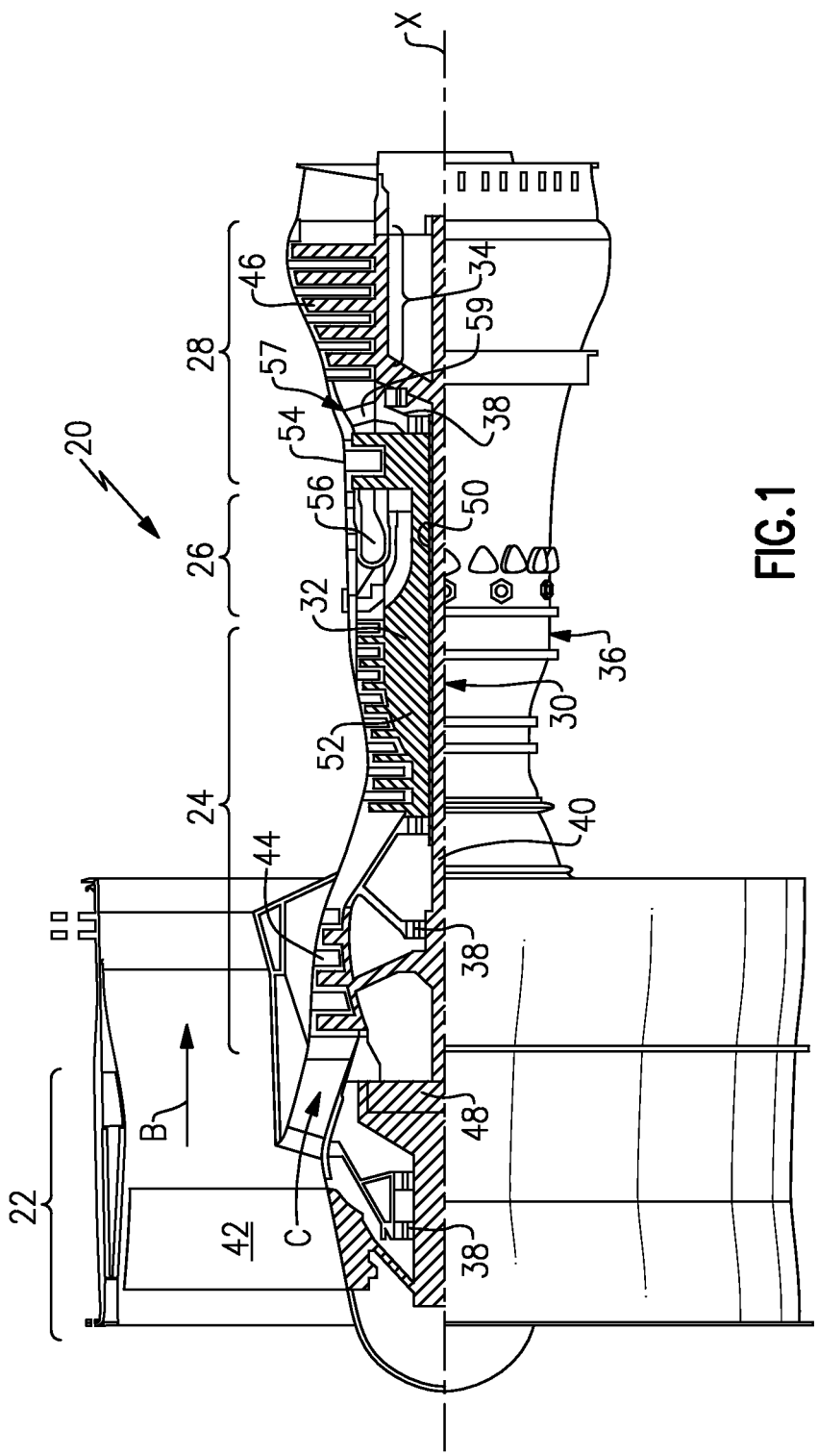
FIG. 1 schematically illustrates a gas turbine engine embodiment.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis X relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis X.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about five (5). The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 57 of the engine static structure 36 is arranged generally between the high pressure turbine 54 and the low pressure turbine 46. The mid-turbine frame 57 further supports bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 57 includes vanes 59, which are in the core airflow path and function as an inlet guide vane for the low pressure turbine 46. Utilizing the vane 59 of the mid-turbine frame 57 as the inlet guide vane for low pressure turbine 46 decreases the length of the low pressure turbine 46 without increasing the axial length of the mid-turbine frame 57. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(\text{Tram } ° R)/(518.7° R)]^{0.5}$. The "Low corrected fan tip speed", as disclosed herein according to one non-limiting embodiment, is less than about 1150 ft/second.

The disclosed serpentine cooling passage may be used in various gas turbine engine components. For exemplary purposes, a turbine blade 64 is described. It should be understood that other shapes of cooling passage may also be used, such as cooling flags that run parallel to the tip.

Figure 2A:
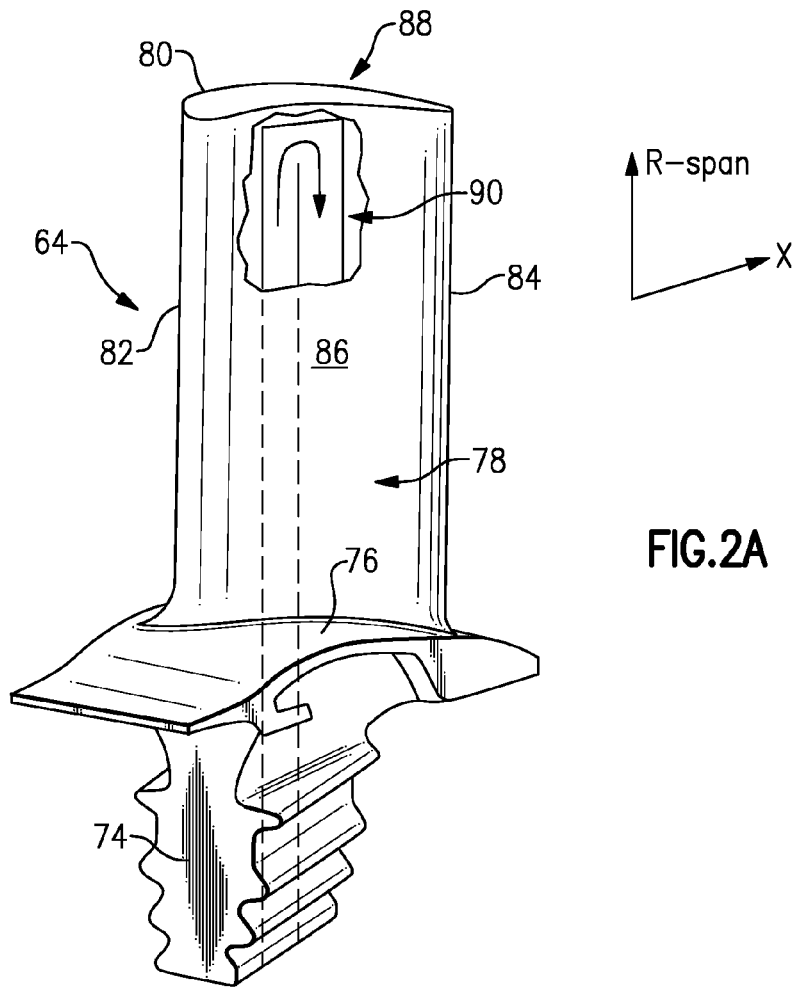
FIG. 2A is a perspective view of the airfoil having the disclosed cooling passage.
Figure 2B:
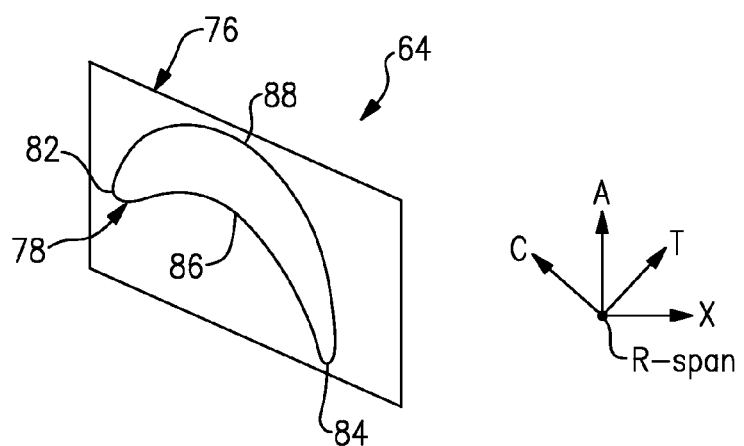
FIG. 2B is a plan view of the airfoil illustrating directional references.
Figure 3:
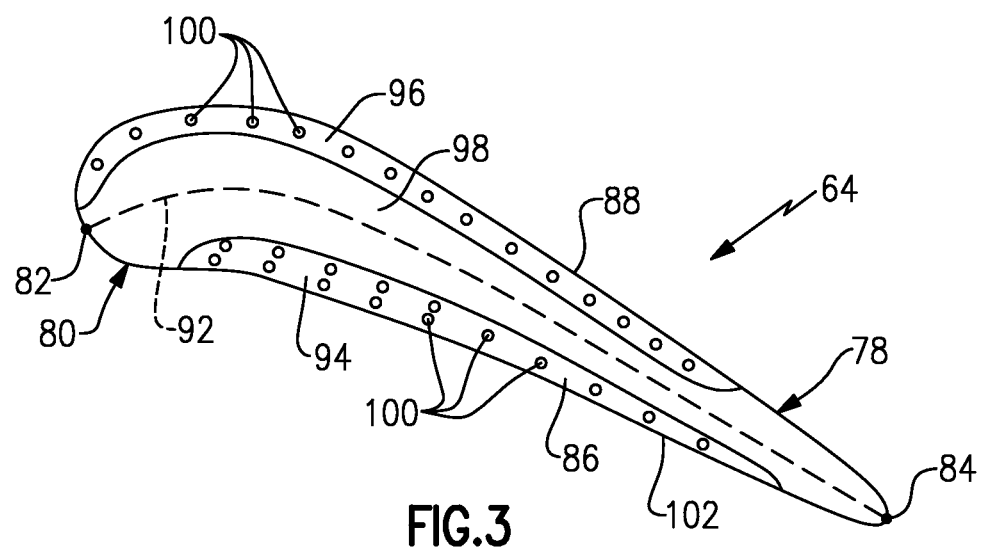
FIG. 3 is one example top elevational view of tip cooling features of a turbine blade.

Referring to FIGS. 2A and 2B, a root 74 of each turbine blade 64 is mounted to the rotor disk. The turbine blade 64 includes a platform 76, which provides the inner flow path, supported by the root 74. An airfoil 78 extends in a radial direction R from the platform 76 to a tip 80 that has a perimeter 102 (FIG. 3). It should be understood that the turbine blades may be integrally formed with the rotor such that the roots are eliminated. In such a configuration, the platform is provided by the outer diameter of the rotor. The airfoil 78 provides leading and trailing edges 82, 84. The tip 80 is arranged adjacent to a blade outer air seal 104 (shown in FIG. 4).

The airfoil 78 of FIG. 2B somewhat schematically illustrates exterior airfoil surface extending in a chord-wise direction C from a leading edge 82 to a trailing edge 84. The airfoil 78 is provided between pressure (typically concave) and suction (typically convex) wall 86, 88 in an airfoil thickness direction T, which is generally perpendicular to the chord-wise direction C. Multiple turbine blades 64 are arranged circumferentially in a circumferential direction A.

The airfoil 78 extends from the platform 76 in the radial direction R, or spanwise, to the tip 80.

The airfoil 78 includes a cooling passage 90 provided between the pressure and suction walls 86, 88. The exterior airfoil surface may include multiple film cooling holes (not shown) in fluid communication with the cooling passage 90.

Referring to FIG. 3, a camber line 92, or chord line, is provided at the tip 80 and extends from the leading edge 82 to the trailing edge 84. The camber line 92 generally bisects the airfoil into pressure and suction sides such that the camber line 92 is generally equidistant from the pressure and suctions sides of the exterior airfoil surface in the span direction R.

Pressure and suction side shelves 94, 96 arranged in the exterior surface on opposing sides of the camber line 92 respectively in the pressure and suction side walls 86, 88. A plateau 98 is provided at the tip 80 proud of and separating the pressure and suction side shelves 94, 96. The plateau 98 is arranged along the camber line 92 and extends to the leading edge 82, which prevent leakage past the tip 80. In the example, the plateau 98 also extends to the trailing edge 84 such that the plateau 98 extends to the perimeter 102 at the leading and trailing edges 82, 84. In the example, both the pressure and suction side shelves 94, 96 are spaced from the leading and trailing edge 82, 84.

Cooling holes 100 fluidly interconnect the cooling passage 90 (FIG. 2A) and the pressure and suction side shelves 94, 96 to create a boundary cooling layer. In the example, the cooling holes 100 are spaced from the plateau 92. Spacing the cooling holes 100 away from the plateau 92 allows the cooling holes 100 to fluidly connect with the cooling passage 90 and maintain sufficient wall thicknesses.

Figure 4:
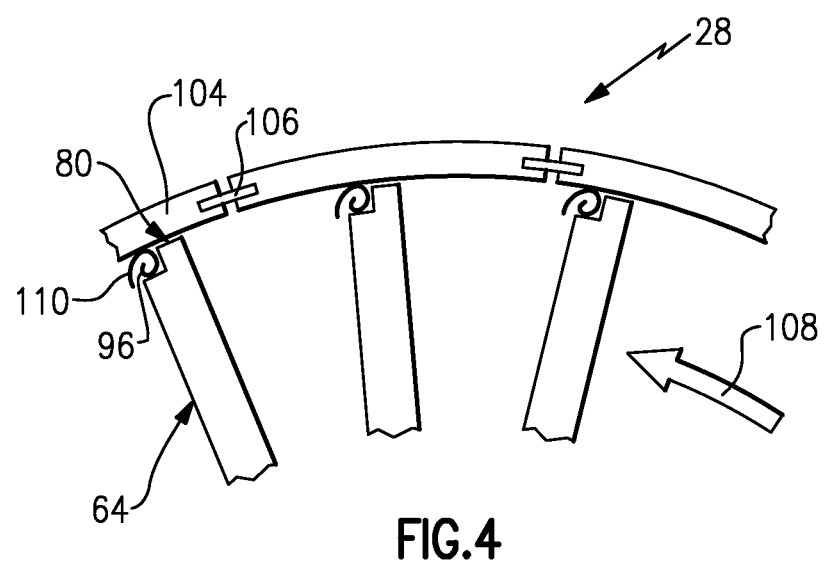
FIG. 4 is schematic view of an array of turbine blades with the tip cooling features of FIG. 3.

Referring to FIG. 4, blade outer air seals (BOAS) 104 are arranged circumferentially about the blades 64 and sealed relative to one another by seals 106. As the blades rotate in direction 108, a vortex 110 is formed at the tip 80 on the suction sides of the blades 64. The vortex 110 may create a high heat transfer coefficient at the suction side tip, which may cause burn-through and cracking. Providing a suction side shelf 96 with cooling holes 100 cools this hot region.

Although example embodiments have been disclosed, a worker of ordinary skill in this art would recognize that certain modifications would come within the scope of the claims. For example, different type and arrangements of turbulence promoting features may be used. For that and other reasons, the following claims should be studied to determine their true scope and content.

What is claimed is:

1. An airfoil for a gas turbine engine comprising:
   pressure and suction walls spaced apart from one another and joined at leading and trailing edges to provide an airfoil having an exterior surface that extends in a radial direction to a tip, a camber line at the tip extending from the leading edge to the trailing edge;
   pressure and suction side shelves arranged in the exterior surface on opposing sides of the camber line respectively in the pressure and suction walls;
   a plateau proud of and separating the pressure and suction side shelves, the plateau arranged along the camber line and extending from the leading edge to the trailing edge and from the pressure side shelf to the suction side shelf in an airfoil thickness direction, wherein the plateau is without a tip pocket; and
   wherein the airfoil has a cooling passage arranged between the pressure and suction walls that extends toward the tip, and cooling holes fluidly interconnecting the cooling passage and the pressure and suction side shelves, wherein at least one of the pressure side shelf and the suction side shelf is spaced from the leading edge.

2. The airfoil according to claim 1, wherein the cooling holes are spaced from the plateau.

3. The airfoil according to claim 1, wherein the tip includes a perimeter, and the plateau extends to the perimeter at the leading and trailing edges.

4. The airfoil according to claim 3, wherein the pressure side shelf is spaced from the trailing edge.

5. The airfoil according to claim 3, wherein the suction side shelf is spaced from the trailing edge.

6. The airfoil according to claim 3, wherein the pressure wall is concave and the suction wall is convex.

7. The airfoil according to claim 1, wherein the camber line generally bisects the airfoil into pressure and suction sides.

8. The airfoil according to claim 1, wherein the airfoil is a turbine blade.

9. A gas turbine engine comprising:
   a compressor and turbine section mounted to a shaft, and a combustor arranged between the compressor and turbine section; and
   an airfoil in one of the compressor and turbine sections, the airfoil includes pressure and suction walls spaced apart from one another and joined at leading and trailing edges to provide an airfoil having an exterior surface that extends in a radial direction to a tip, a camber line at the tip extending from the leading edge to the trailing edge;
   pressure and suction side shelves arranged in the exterior surface on opposing sides of the camber line respectively in the pressure and suction walls;
   a plateau proud of and separating the pressure and suction side shelves, the plateau arranged along the camber line and extending from the leading edge to the trailing edge and from the pressure side shelf to the suction side shelf in an airfoil thickness direction, wherein the plateau is without a tip pocket; and
   wherein the airfoil has a cooling passage arranged between the pressure and suction walls that extends toward the tip, and cooling holes fluidly interconnecting the cooling passage and the pressure and suction side shelves, wherein at least one of the pressure side shelf and the suction side shelf is spaced from the leading edge.

10. The gas turbine engine according to claim 9, wherein the airfoil is in the turbine section.

11. The gas turbine engine according to claim 10, comprising a blade outer air seal, the tip arranged adjacent to the blade outer air seal.

12. The gas turbine engine according to claim 9, wherein the cooling holes are spaced from the plateau.

13. The gas turbine engine according to claim 9, wherein the tip includes a perimeter, and the plateau extends to the perimeter at the leading and trailing edges.

* * * * *